US010640375B2

(12) United States Patent
Tsuboi et al.

(10) Patent No.: US 10,640,375 B2
(45) Date of Patent: May 5, 2020

(54) TAR REFORMING FURNACE (71) Applicant: IHI Corporation, Koto-ku (JP)

(72) Inventors: Yosuke Tsuboi, Koto-ku (JP); Shintaro Ito, Koto-ku (JP)

(73) Assignee: IHI Corporation, Koto-ku (JP)

( * ) Notice: Subject to any disclaimer, the term of this patent is extended or adjusted under 35 U.S.C. 154(b) by 13 days.

(21) Appl. No.: 15/177,821

(22) Filed: Jun. 9, 2016

(65) Prior Publication Data

US 2016/0289067 A1 Oct. 6, 2016

Related U.S. Application Data (63) Continuation of application No. PCT/JP2014/081762, filed on Dec. 1, 2014.

(30) Foreign Application Priority Data

Dec. 13, 2013 (JP) .................................. 2013-257657
Jun. 24, 2014 (JP) .................................. 2014-128780

(51) Int. Cl.
*C10K 3/00* (2006.01)
*C01B 3/50* (2006.01)
(Continued)

(52) U.S. Cl.
CPC .................. *C01B 3/02* (2013.01); *B01J 7/00* (2013.01); *B01J 19/0046* (2013.01); *C01B 3/36* (2013.01);
(Continued)

(58) Field of Classification Search
CPC combination set(s) only.
See application file for complete search history.

(56) References Cited

U.S. PATENT DOCUMENTS 3,044,859 A * 7/1962 Parker ...................... C09C 1/50
423/456
4,311,456 A * 1/1982 Kletch ...................... C21B 9/00
431/170
(Continued)

FOREIGN PATENT DOCUMENTS

EP 0 926 220 A1 6/1999
JP 11-51358 2/1999
(Continued)

OTHER PUBLICATIONS

International Search Report dated Mar. 3, 2015 in PCT/JP2014/081762 filed on Dec. 1, 2014.
(Continued)

*Primary Examiner* — Kaity V Chandler
(74) *Attorney, Agent, or Firm* — Oblon, McClelland, Maier & Neustadt, L.L.P.

(57) ABSTRACT

Syngas is alternatingly introduced by a syngas alternating lead-in system through either of one- and the other-end-side heat storage bodies into flow passages in a primary reforming furnace, and oxidant is alternatingly supplied to the syngas by a primary-oxidant alternating supply system. The syngas derived from the primary reforming furnace by a syngas alternating lead-out system is introduced into a secondary reforming furnace to which connected is a secondary-oxidant supply system for supply of oxidant only at alternation in the syngas alternating lead-in and -out systems.

3 Claims, 6 Drawing Sheets (51) Int. Cl.
    *B01J 7/00*         (2006.01)
    *B01J 19/00*       (2006.01)
    *C01B 3/02*        (2006.01)
    *C01B 3/36*        (2006.01)
    *C10J 3/00*        (2006.01)

(52) U.S. Cl.
    CPC .................. *C01B 3/50* (2013.01); *C10J 3/00* (2013.01); *C10K 3/005* (2013.01); *B01J 2219/0059* (2013.01); *B01J 2219/00495* (2013.01); *B01J 2219/00756* (2013.01); *C01B 2203/0255* (2013.01); *C01B 2203/048* (2013.01); *C01B 2203/061* (2013.01); *C01B 2203/0833* (2013.01); *C01B 2203/1252* (2013.01); *C01B 2203/142* (2013.01); *C01B 2203/146* (2013.01); *C10J 2300/092* (2013.01); *C10J 2300/093* (2013.01); *C10J 2300/0946* (2013.01); *C10J 2300/1603* (2013.01)

(56) References Cited

U.S. PATENT DOCUMENTS

| | | | | |
|---|---|---|---|---|
| 4,658,736 A | * | 4/1987 | Walter | F23G 5/46 110/210 |
| 5,402,739 A | * | 4/1995 | Abboud | F23G 5/006 110/204 |
| 6,488,076 B1 | * | 12/2002 | Yasuda | F23G 7/065 165/10 |
| 2004/0237861 A1 | * | 12/2004 | Azuma | F23G 5/027 110/344 |
| 2005/0051299 A1 | * | 3/2005 | Graham | F28F 9/0239 165/82 |

FOREIGN PATENT DOCUMENTS

| | | |
|---|---|---|
| JP | 11-223482 | 8/1999 |
| JP | 2001-158885 | 6/2001 |
| JP | 2003-137507 | 5/2003 |
| JP | 2004-99702 | 4/2004 |
| JP | 2005-60533 | 3/2005 |
| JP | 2007-99927 | 4/2007 |
| JP | 3984535 | 10/2007 |

OTHER PUBLICATIONS

Extended European Search Report dated Aug. 8, 2017 in Patent Application No. 14869814.5.

* cited by examiner

TAR REFORMING FURNACE

TECHNICAL FIELD

The present disclosure relates to a tar reforming furnace.

BACKGROUND ART

Development of a fuel gasification installation has been advanced for production of gasified gas (syngas which is mixed gas of CO with $H_2$), using as fuel solid fuel such as coal, wood-based biomass, waste plastic or various wet wastes.

Generally, gasification of the solid fuel at lower temperature (600-900° C.) in a gasification furnace produces tar-containing syngas. Tar condenses as the tar-containing syngas lowers in temperature. As a result, use of the syngas as chemosynthetic material, fuel for power generation or the like brings about problems such as clogging of piping and trouble in equipment due to tar and poisoning of a synthetic catalyst due to adhesion of tar in a downstream refinery, chemically synthesizing or power generation process.

Conventionally known technique for removal of tar contained in the syngas is tar reforming at high temperature in an oxidation reforming furnace. This is a technique of introducing the syngas produced in a gasification furnace into the oxidation reforming furnace where the syngas is burned with addition of air or oxygen into a temperature on the order of 1000-1400° C. and concurrently tar contained is reformed through oxidation reforming or steam reforming.

However, the conventional tar reforming furnace using the common oxidation reforming spends much in oxygen-purchasing cost or pure-oxygen-producing-installation and running costs, resulting in a factor of cost increase in a gasification system as a whole.

There exist, for example, Patent Literatures 1 and 2 showing general state of the art pertinent to a tar reforming furnace which overcomes such problems.

CITATION LIST

Patent Literature

[Patent Literature 1] JP 3984535B
[Patent Literature 2] JPH 11-51358A

SUMMARY

Technical Problems

A tar reforming furnace disclosed in Patent Literature 1 is not a tar reforming furnace using oxidation reforming but resolves and removes tar in a honeycomb-structured heat storage body elevated in temperature, which is, however, complex in structure because of having a rotary mechanism for rotatively driving the heat storage body and highly tends to have insufficient tar reforming because of short residence time of the syngas at a hot area. Moreover, there is concern about leaking of the syngas from the rotary body, which may bring about tar remaining in the gas reformed.

In a tar reforming furnace disclosed in Patent Literature 2, tar-containing exhaust gas is caused to flow through and is preheated by one of alternating introduction ducts into high-temperatured one of heat storage bodies and is further heated and burned in the furnace to remove tar; the exhaust gas made free from the tar heats the other of the heat storage bodies and is discharged through the other of the alternating discharge ducts; then, the flows of the exhaust gas are alternately changed over, thereby providing the regenerative tar reforming furnace. However, there is a fear that the unreformed tar-containing exhaust gas from the one of the alternating introduction ducts is discharged directly to the one of the alternating discharge ducts at the timing of alternation or changeover.

The disclosure was made in view of the above-mentioned conventional problems and has its object to provide a tar reforming furnace which can satisfactorily conduct tar reforming with a simple structure and can prevent unreformed tar-containing syngas from being discharged at alternation.

Solution to Problems

The disclosure is directed to a tar reforming furnace characterized in that it comprises a primary reforming furnace internally formed with syngas flow passages, a one-end-side heat storage body in a one-end-side lead-in-out port of the primary reforming furnace, the other-end-side heat storage body in the other-end-side lead-in-out port of the primary reforming furnace, a syngas alternating lead-in system for alternatingly introducing the syngas through one of the heat storage bodies into the flow passages in the primary reforming furnace, a primary-oxidant alternating supply system for alternatingly supplying an oxidant to the syngas introduced from the syngas alternating lead-in system through the one of the heat storage bodies into the flow passages in the primary reforming furnace, a syngas alternating lead-out system for alternatingly deriving the reformed syngas supplied with the oxidant by the primary-oxidant alternating supply system through the other of the heat storage bodies, a secondary reforming furnace into which is introduced the syngas from the primary reforming furnace through the syngas alternating lead-out system and a secondary-oxidant supply system for supplying an oxidant to the syngas introduced into the secondary reforming furnace only at alternation in the syngas alternating lead-in and -out systems.

The tar reforming furnace is preferably configured to introduce the syngas from the syngas alternating lead-in system axially into the primary reforming furnace and supply the oxidant from the primary-oxidant alternating supply system tangentially to a virtual circle around an axis of the primary reforming furnace.

The tar reforming furnace is preferably configured to introduce the syngas from the syngas alternating lead-out system axially into the secondary reforming furnace and supply the oxidant from the secondary-oxidant supply system tangentially to a virtual circle around an axis of the secondary reforming furnace.

Alternatively, it is preferable that the tar reforming furnace is configured to supply the syngas supplied from the syngas alternating lead-in system to the one-end-side lead-in-out port of the primary reforming furnace and passed through the one-end-side heat storage body tangentially to a one-side one of the flow passages with circular cross-sections in the primary reforming furnace and introduce the oxidant from the primary-oxidant alternating supply system axially into the one-side flow passage with the circular cross-sections in the primary reforming furnace and is configured to supply the syngas supplied from the syngas alternating lead-in system to the other-end-side leadin-out port of the primary reforming furnace and passed through the other-end-side heat storage body tangentially to the other-side flow passage with the circular cross-section in the primary reforming furnace and introduce the oxidant from the primary-oxidant alternating supply system axially into the other-side flow passage with the circular cross-section in the primary reforming furnace.

The tar reforming furnace is preferably configured to supply the syngas from the syngas alternating lead-out system tangentially to the secondary reforming furnace with a circular cross-section and introduce the oxidant from the secondary-oxidant supply system axially to the secondary reforming furnace with the circular cross-section.

Preferably, the tar reforming furnace further comprises soot blowers for removing foreign matters attached to the heat storage bodies.

Effects

A tar reforming furnace according to the disclosure can exhibit excellent effects that tar reforming can be satisfactorily conducted with a simple structure and unreformed tar-containing syngas can be prevented from being discharged at alternation.

DESCRIPTION OF EMBODIMENTS

Embodiments of the disclosure will be described in conjunction with attached drawings.

Figure 2:
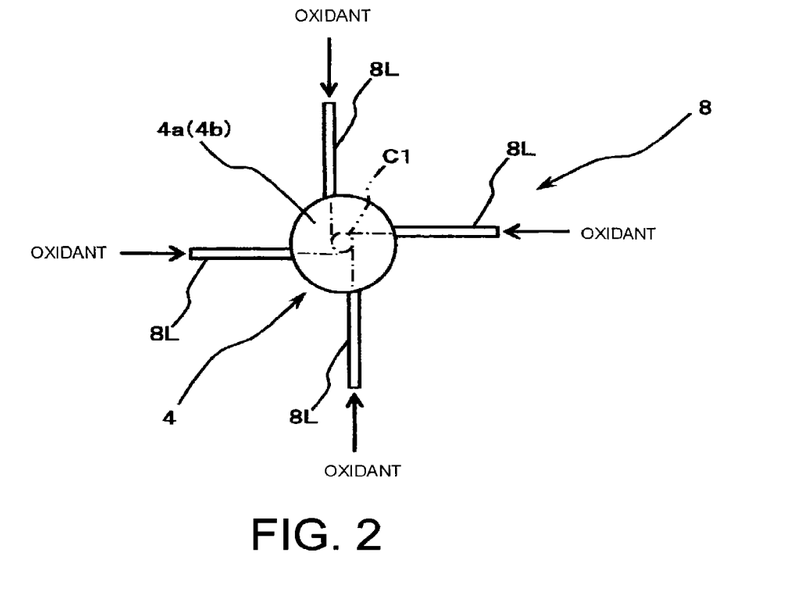
FIG. 2 is a plan view showing a primary-oxidant alternating supply system in the embodiment of the tar reforming furnace according to the disclosure.
Figure 3:
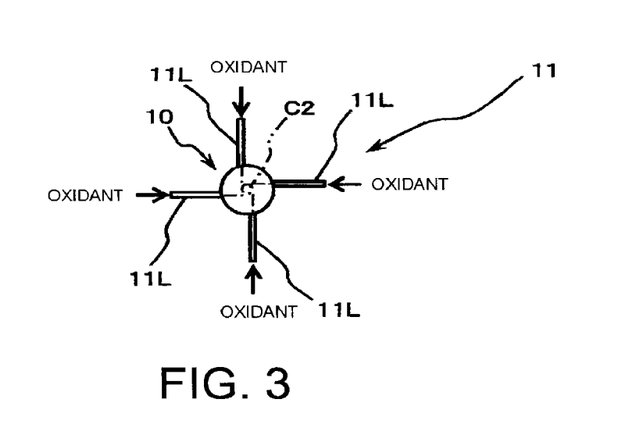
FIG. 3 is a plan view showing a secondary-oxidant supply system in the embodiment of the tar reforming furnace according to the disclosure.
Figure 4:
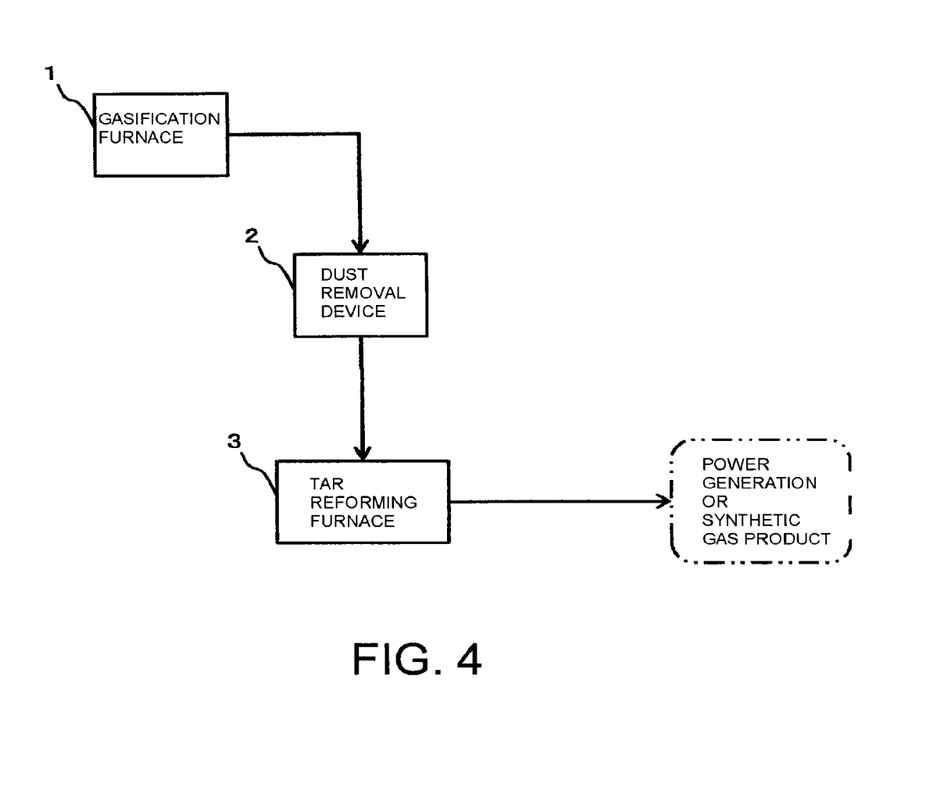
FIG. 4 is a schematic diagram showing an example of a whole system including the tar reforming furnace according to the disclosure.

FIGS. 1-4 show an embodiment of a tar reforming furnace according to the disclosure. For example, a system with the tar reforming furnace comprises, as shown in FIG. 4, a gasification furnace 1 for gasification of solid fuel, a dust removal device 2 for dust removal of syngas produced in the gasification furnace 1 and the tar reforming furnace 3 for resolution and removal of tar from the syngas made free from dust in the dust removal device 2. In the system, the tar-containing syngas produced in the gasification furnace 1 is made free from dust in the dust removal device 2 and is introduced into the tar reforming furnace 3 where tar is resolved and removed. The gas with the tar being resolved and removed therefrom is subject to a pre- or refining-treatment (not shown) and then is used for power generation or as synthetic gas product such as methane, dimethyl ether (DME) or methanol.

Figure 1:
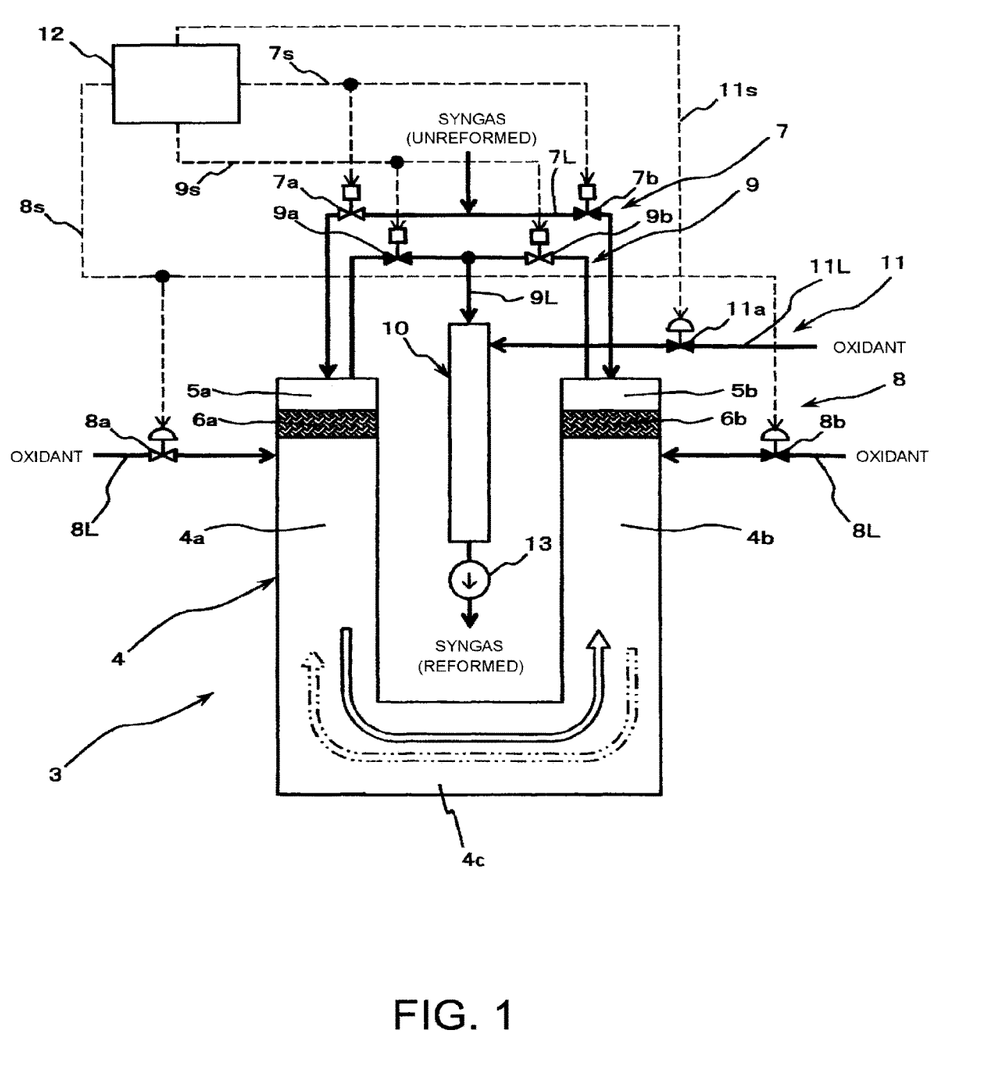
FIG. 1 is a conceptual diagram showing an embodiment of a tar reforming furnace according to the disclosure.

The tar reforming furnace 3 comprises, as shown in FIG. 1, a primary reforming furnace 4 with a U-shaped section and internally formed with flow passages 4a and 4b and a communication passage 4c for syngas. The primary reforming furnace 4 has one- and the other-end-side lead-in-out ports 5a and 5b with one- and the other-end-side heat storage bodies 6a and 6b, respectively.

The lead-in-out ports 5a and 5b of the primary reforming furnace 4 are connected with a syngas alternating lead-in system 7 which alternatingly introduces the syngas through one of the one-end side and the other-end-side heat storage bodies 6a and 6b to the flow passage 4a and 4b in the primary reforming furnace 4.

The flow passages 4a and 4b in the primary reforming furnace 4 are connected with a primary-oxidant alternating supply system 8 which alternatingly supplies an oxidant (air or oxygen) to the syngas introduced into the flow passage 4a or 4b in the primary reforming furnace 4 by the syngas alternating lead-in system 7 at the one of the one-end side and the other-end-side heat storage bodies 6a and 6b.

The lead-in-out ports 5a and 5b of the primary reforming furnace 4 are connected with a syngas alternating lead-out system 9 which alternatingly leads out or derives the reformed syngas supplied with the oxidant by the primary-oxidant alternating supply system 8 at the other of the one-end side and the other-end-side heat storage bodies 6a and 6b.

A secondary reforming furnace 10 is arranged to which introduced is the syngas from the primary reforming furnace 4 through the syngas alternating lead-out system 9. The secondary reforming furnace 10 is connected with a secondary-oxidant supply system 11 which supplies an oxidant (air or oxygen) to the introduced syngas only at alternation in the syngas alternating lead-in-out systems 7 and 9.

The syngas alternating lead-in system 7 is constructed such that a syngas supply line 7L supplied with the syngas from the gasification furnace 1 through the dust removal device 2 (see FIG. 4) is branched and connected to the lead-in-out ports 5a and 5b of the primary reforming furnace 4 with syngas lead-in on-off valves 7a and 7b being arranged downstream of a branch point of the syngas supply line 7L, respectively, in a flow direction of the gas and being alternately opened/closed by an alternation control signal 7s from a controller 12.

The primary-oxidant alternating supply system 8 is constructed such that primary-oxidant supply lines 8L supplied with the oxidant are connected to the flow passage 4a and 4b at positions below the heat storage bodies 6a and 6b in the primary reforming furnace 4 and the primary-oxidant supply lines 8L are provided with primary-oxidant on-off valves 8a and 8b, respectively, which are alternately opened/closed by an alternation control signal 8s from the controller 12.

The syngas alternating lead-out system 9 is constructed such that syngas lead-out lines 9L connected with the lead-in-out ports 5a and 5b of the primary reforming furnace 4 are provided with syngas lead-out on-off valves 9a and 9b, respectively, which are alternately opened/closed by an alternation control signal 9s from the controller 12, the syngas lead-out lines 9L being joined together and connected to the secondary reforming furnace 10.

The secondary-oxidant supply system 11 is constructed such that secondary-oxidant supply lines 11L supplied with the oxidant are connected to an upper portion of the secondary reforming furnace 10 and are provided with secondary oxidant on-off valves 11a, respectively, which are opened/closed by an alternation control signal 11s from the controller 12.

Arranged downstream of the secondary reforming furnace 10 is a draft fan 13 which draws in the syngas. In order that an inside of the primary reforming furnace 4 may be elevated in temperature up to a predetermined temperature (on the order of about 1100° C.) before the introduction of the syngas, the flow passage or passages 4a or/and 4b at the positions below the heat storage bodies 6a and 6b or/and the communication passage 4c in the primary reforming furnace 4 are provided with preheating burners (not shown), respectively, using city gas or the like.

It is preferable for facilitated mixing of the syngas with the oxidant that the syngas is introduced axially into the primary reforming furnace 4 through the syngas supply line 7L in the syngas alternating lead-in system 7 while, as shown in FIG. 2, the oxidant is supplied from the primary-oxidant supply lines 8L in the primary-oxidant alternating supply system 8 tangentially to a virtual circle C1 around an axis of the primary reforming furnace 4. Exemplified in FIG. 2 is a case where the four primary-oxidant supply lines 8L are connected circumferentially of the primary reforming furnace 4; however, the number of the primary-oxidant supply lines 8L is not restricted thereto.

It is preferable for facilitated mixing of the syngas with the oxidant that the syngas is introduced axially into the secondary reforming furnace 10 through the syngas lead-out lines 9L of the syngas alternating lead-out system 9 while, as shown in FIG. 3, the oxidant is supplied from the secondary-oxidant supply lines 11L in the secondary-oxidant supply system 11 tangentially to a virtual circle C2 around an axis of the secondary reforming furnace 10. Exemplified in FIG. 3 is a case where the four secondary-oxidant supply lines 11L are connected circumferentially of the secondary reforming furnace 10; however, the number of the secondary-oxidant supply lines 11L is not restricted thereto.

Next, a mode of operation of the above embodiment will be described.

As shown in FIG. 4, the tar-containing syngas produced in the gasification furnace 1 is made free from dust in the dust removal device 2 and is introduced into the tar reforming furnace 3. Before introduction of the syngas into the tar reforming furnace 3, the inside of the primary reforming furnace 4 is elevated up to a predetermined temperature (on the order of about 1100° C.) by the preheating burner or burners (not shown), using city gas or the like.

In FIG. 1, the syngas lead-in on-off valves 7a and 7b incorporated in the syngas supply line 7L in the syngas alternating lead-in system 7 leading to the lead-in-out ports 5a and 5b of the primary reforming furnace 4 are opened and closed, respectively, by the alternation control signal 7s from the controller 12. In this state, the syngas lead-out on-off valves 9a and 9b incorporated in the syngas lead-out lines 9L in the syngas alternating lead-out system 9 connected to the lead-in-out ports 5a and 5b are closed and opened, respectively, by the alternation control signal 9s from the controller 12. In this case, the primary-oxidant on-off valves 8a and 8b incorporated in the one and the other primary-oxidant supply lines 8L in the primary-oxidant alternating supply system 8 connected to the flow passages 4a and 4b below the heat storage bodies 6a and 6b of the primary reforming furnace 4 are opened and closed, respectively, by the alternation control signal 8s from the controller 12.

In this state, the tar-containing syngas is entered from the one-end-side lead-in-out port 5a of the primary reforming furnace 4 and is passed through and preheated by the one-end-side heat storage body 6a and then is blown with and oxidation reformed by the oxidant; then, the gas is passed through the flow passage 4a, the communication passage 4c, the flow passage 4b and the other-end-side heat storage body 6b; and then, the gas is guided through the other-end-side lead-in-out port 5b and through the secondary reforming furnace 10 and is passed downstream under pressure.

After the elapse of a predetermined period of time (a few seconds to dozens of seconds), in FIG. 1, the syngas lead-in on-off valves 7a and 7b incorporated in the syngas supply line 7L of the syngas alternating lead-in system 7 branched and leading to the lead-in-out ports 5a 5b of the primary reforming furnace 4 are closed and opened, respectively, by the alternation control signal 7s from the controller 12. The syngas lead-out on-off valves 9a and 9b incorporated in the syngas lead-out lines 9L in the syngas alternating lead-out system 9 connected to the lead-in-out ports 5a and 5b are opened and closed, respectively, by the alternation control signal 9s from the controller 12. In this case, the primary-oxidant on-off valves 8a and 8b incorporated in the one and the other primary-oxidant supply lines 8L in the primary-oxidant alternating supply system 8 connected to the flow passages 4a and 4b below the heat storage bodies 6a and 6b in the primary reforming furnace 4 is closed and opened, respectively, by the alternation control signal 8s from the controller 12.

In this state, the tar-containing syngas is entered from the other-end-side lead-in-out port 5b of the primary reforming furnace 4 and passed through and preheated by the other-end-side heat storage body 6b and then is blown with and oxidation reformed by the oxidant; then, the gas is passed through the flow passage 4b, the communication passage 4c, the flow passage 4a and the one-end-side heat storage body 6a; and then, the gas is guided through the one-end-side lead-in-out port 5a and through the secondary reforming furnace 10 and is passed downstream under pressure.

As mentioned in the above, through the alternation in the syngas alternating lead-in and -out systems 7 and 9 and in the primary-oxidant alternating supply system 8 at every predetermined time interval, the operations of the syngas being passed through and preheated by the one- and the other-end-side heat storage bodies 6a and 6b and being passed through and heating the other- and the one-end-side heat storage bodies 6b and 6a, respectively, are alternately repeated to continuously reform the tar contained in the syngas.

Here, at the timing of the alternation of the respective syngas lead-out on-off valves 9a and 9b in the syngas alternating lead-out system 9, the unreformed tar-containing syngas may be discharged from the one- and the other-end-side lead-in-out ports 5a and 5b directly to the one and the other syngas lead-out lines 9L, respectively.

However, in accordance with the timing of the alternation of the respective syngas lead-out on-off valves 9a and 9b in the syngas alternating lead-out system 9, the secondary-oxidant on-off valves 11a incorporated in the secondary-oxidant supply lines 11L in the secondary-oxidant supply system 11 connected to the upper portion of the secondary reforming furnace 10 are opened to supply the oxidant to the secondary reforming furnace 10 by the alternation control signal 11s from the controller 12. Thus, unreformed tar is reformed in the secondary reforming furnace 10 and is prevented from being discharged downstream without reformed.

As a result, unlike the tar reforming furnace disclosed in Patent Literature 1, no rotary mechanism for rotatively driving the heat storage body is needed, which simplifies the structure and enables sufficient tar reforming because of long residence time of the syngas at the hot area.

Furthermore, unlike the tar reforming furnace disclosed in Patent Literature 2, even if any unreformed tar-containing syngas is discharged through the one- or the other-end-side lead-in-out port 5a or 5b directly to the one or the other syngas lead-out line 9L at the timing of the alternation, the oxidant is supplied to the secondary reforming furnace 10 only at the alternation in the syngas alternating lead-in and -out systems 7 and 9 and the unreformed tar is reformed. There is no fear of any unreformed tar being discharged downstream without reformed.

The syngas introduced from the syngas supply line 7L in the syngas alternating lead-in system 7 is axial to the primary reforming furnace 4 while, as shown in FIG. 2, the oxidant supplied from the primary-oxidant supply lines 8L in the primary-oxidant alternating supply system 8 is tangential to the virtual circle C1 around the axis of the primary reforming furnace 4. Thus, the oxidant becomes a swirling flow to the syngas introduced axially into the primary reforming furnace 4, which facilitates the mixing and enables more efficient reforming of the tar contained in the syngas in the primary reforming furnace 4.

Further, the syngas introduced from the syngas lead-out lines 9L in the syngas alternating lead-out system 9 is axial to the secondary reforming furnace 10 while, as shown in FIG. 3, the oxidant supplied from the secondary-oxidant supply lines 11L in the secondary-oxidant supply system 11 is tangential to the virtual circle C2 around the axis of the secondary reforming furnace 10. Thus, the oxidant becomes a swirling flow to the syngas introduced axially into the secondary reforming furnace 10, which facilitates the mixing and enables more efficient reforming of the tar contained in the syngas in the secondary reforming furnace 10 when the unreformed tar-containing syngas is introduced into the secondary reforming furnace 10 at the alternation.

Thus, with the simple structure, tar reforming can be satisfactorily conducted and the unreformed tar-containing syngas can be prevented from being discharged at the alternation.

By the configuration to introduce the syngas from the syngas alternating lead-in system 7 axially into the primary reforming furnace 4 and supply the oxidant from the primary-oxidant alternating supply system 8 tangentially to the virtual circle C1 around the axis of the primary reforming furnace 4, the oxidant becomes swirling flow to the syngas introduced axially into the primary reforming furnace 4, which facilitates mixing and enables more efficient reforming of the tar contained in the syngas within the primary reforming furnace 4.

Further, by the configuration to introduce the syngas from the syngas alternating lead-out system 9 axially into the secondary reforming furnace 10 and supply the oxidant from the secondary-oxidant supply system 11 tangentially to the virtual circle C2 around the axis of the secondary reforming furnace 10, the oxidant becomes swirling flow to the syngas introduced axially into the secondary reforming furnace 10, which facilitates the mixing and enables more efficient reforming of the tar contained in the syngas in the secondary reforming furnace 10 when the unreformed tar-containing syngas is introduced into the secondary reforming furnace 10 at the alternation.

FIGS. 5-9 show a further embodiment of the tar reforming furnace according to the disclosure in which parts similar to those in FIGS. 1-4 are represented by the same reference numerals and its fundamental structure is similar to that shown in FIGS. 1-4.

Figure 5:
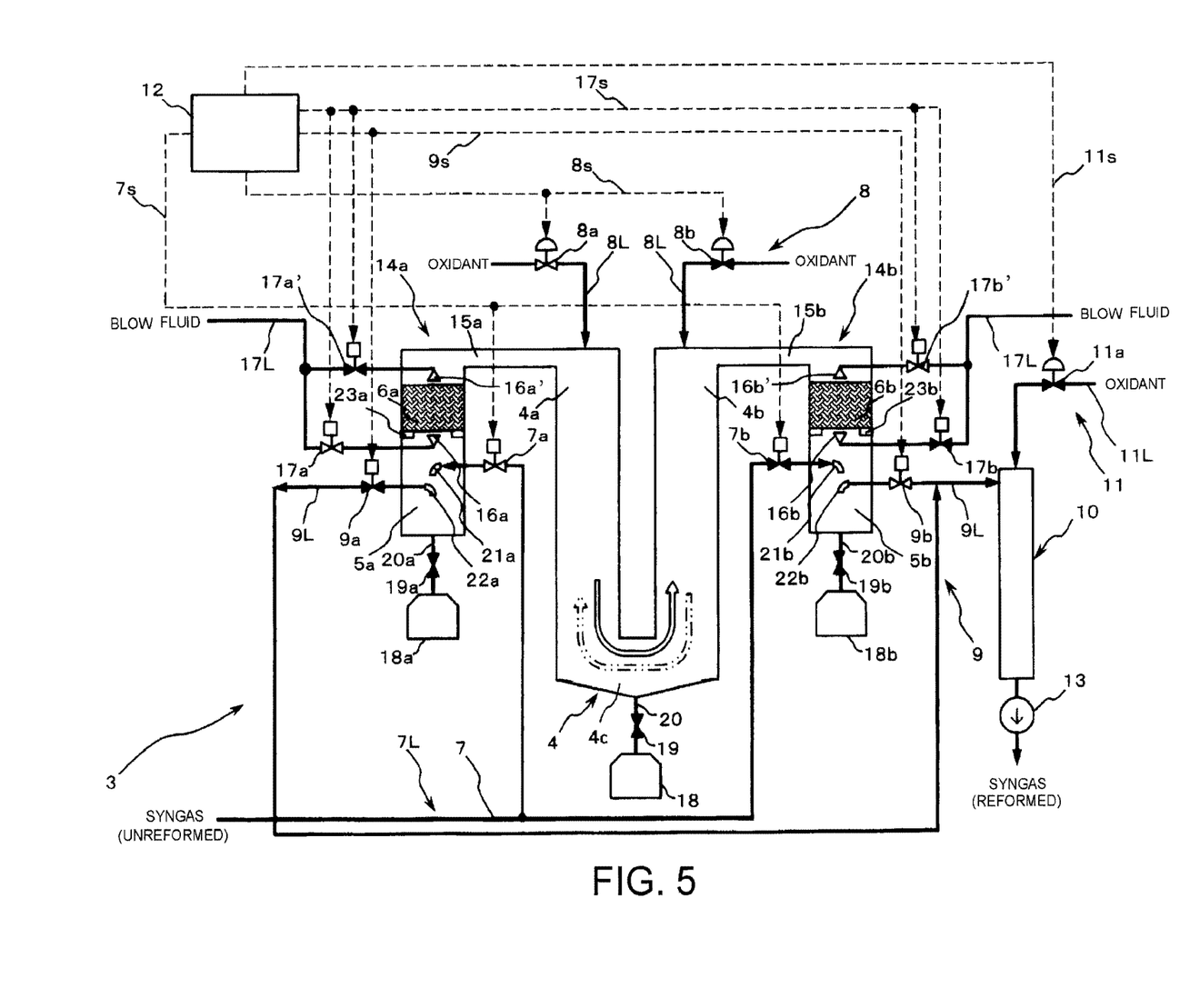
FIG. 5 is a conceptual diagram showing a further embodiment of a tar reforming furnace according to the disclosure.
Figure 6:
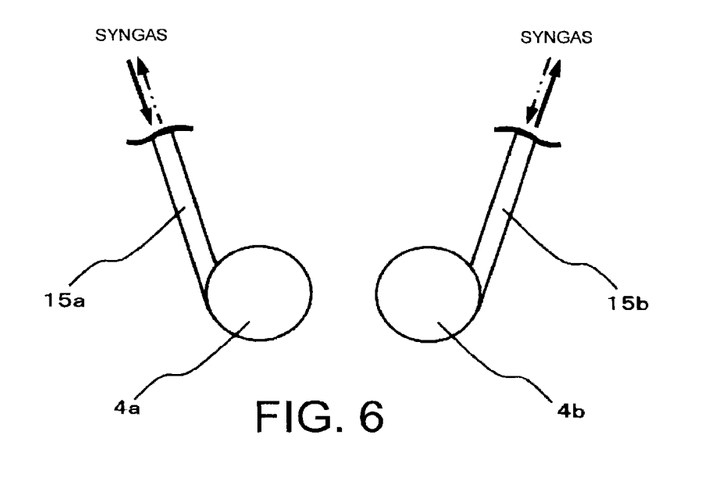
FIG. 6 is a plan view showing supply directions of the syngas to the flow passages in the primary reforming furnace in the further embodiment of the tar reforming furnace according to the disclosure.

In the further embodiment, as shown in FIGS. 5 and 6, syngas supplied from a syngas alternating lead-in system 7 to a one-end-side lead-in-out port 5a in a primary reforming furnace 4 and passed through a one-end-side heat storage body 6a is adapted to be supplied tangentially to a one-side one 4a of the flow passages with circular cross-sections in the primary reforming furnace 4 while oxidant is adapted to be introduced from a primary-oxidant alternating supply system 8 axially into the one-side flow passage 4a with the circular cross-section in the primary reforming furnace 4. Similarly, the syngas supplied from the syngas alternating lead-in system 7 to the other-end-side lead-in-out port 5b in the primary reforming furnace 4 and passed through the other-end-side heat storage body 6b is adapted to be supplied tangentially to the other-side flow passage 4b with a circular cross-section in the primary reforming furnace 4 and the oxidant is adapted to be introduced from the primary-oxidant alternating supply system 8 axially into the other-side flow passage 4b with a circular cross-section in the primary reforming furnace 4.

In order to have the above-mentioned configuration, a one-end-side heat storage unit 14a filled with the one-end-side heat storage body 6a in the primary reforming furnace 4 is formed separately from the flow passage 4a in the primary reforming furnace 4, and upper portions of the flow passage 4a and of the one-end-side heat storage unit 14a are interconnected through a lead-in-out line 15a which is arranged to extend tangentially of the one flow passage 4a with the circular cross-section. Similarly, the other-end-side heat storage unit 14 in the primary reforming furnace 4b filled with the other-end-side heat storage body 6b is formed separately from the flow passage 4b in the primary reforming furnace 4, and upper portions of the flow passage 4b and of the other-end-side heat storage unit 14b are interconnected through a lead-in-out line 15b which is arranged to extend tangentially of the other flow passage 4b with the circular cross-section.

Figure 7:
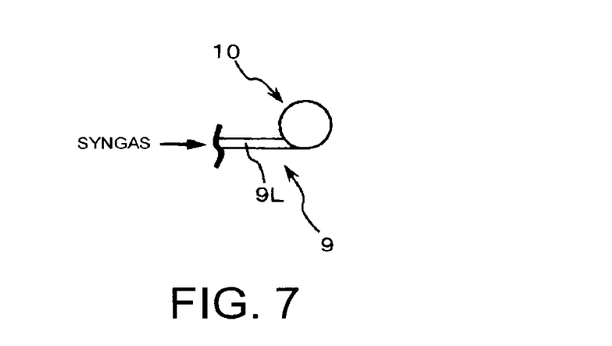
FIG. 7 is a plan view showing a supply direction of the syngas to the secondary reforming furnace in the further embodiment of the tar reforming furnace according to the disclosure.

As shown in FIG. 7, the syngas is supplied from a syngas lead-out line 9L in a syngas alternating lead-out system 9 tangentially to a secondary reforming furnace 10 with a circular cross-section while, as shown in FIG. 5, the oxidant is introduced from a secondary-oxidant supply line 11L in a secondary-oxidant supply system 11 axially into the secondary reforming furnace 10 with the circular cross-section.

Figure 8A:
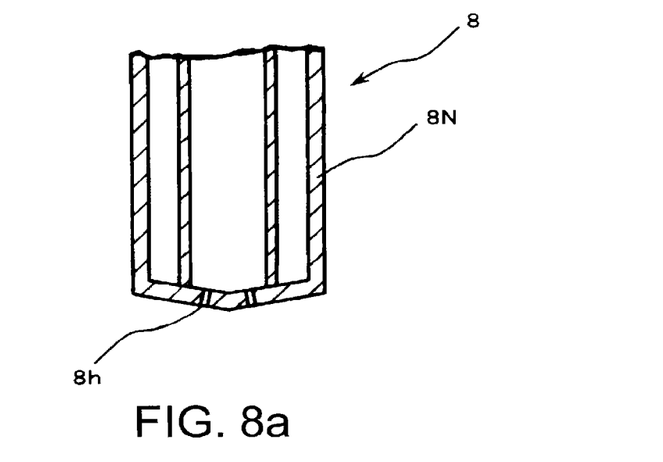
FIG. 8a is a sectional view showing a tip end of a primary-oxidant supply nozzle in the further embodiment of the tar reforming furnace according to the disclosure.
Figure 8B:
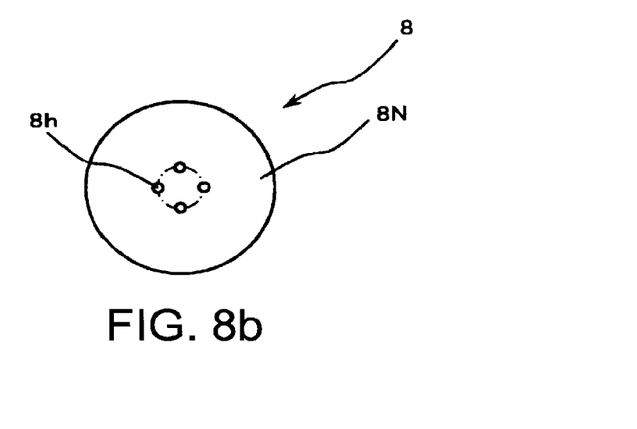
FIG. 8b is a front view of the tip end of the primary-oxidant supply nozzle in the further embodiment of the tar reforming furnace according to the disclosure.

Each of primary-oxidant supply nozzles 8N in the primary-oxidant alternating supply system 8 for introduction of the oxidant to the flow passages 4a and 4b in the primary reforming furnace 4 has a tip end formed with a plurality of (for example, four) injection holes 8h as shown in FIGS. 8a and 8b so as to blow a primary oxidant to the flow passage 4a or 4b in a wide angle to further facilitate the mixing with the syngas. Alternatively, the primary-oxidant supply nozzle 8N may be replaced with a plurality of nozzles each with a single injection hole 8h. Though not illustrated, a secondary-oxidant supply nozzle in the secondary-oxidant supply system 11 may similarly have a tip end formed with a plurality of injection holes so as to blow a secondary oxidant to a secondary reforming furnace 10 in a wider angle to further facilitate the mixing with the syngas; alternatively, the secondary-oxidant supply nozzle may be replaced by a plurality of nozzles each with a single injection hole.

Further, as shown in FIG. 5, the one- and the other-end-side heat storage units 14a and 14b are provided with soot blowers 16a and 16a' and soot blowers 16b and 16b' for removal of soot and other foreign matters attached to the one- and the other-end-side heat storage bodies 6a and 6b, respectively. Blow fluid lines 17L supplied with blow fluid such as nitrogen or other inert gas or steam are branched and connected to the soot blowers 16a and 16a' and the soot blowers 16b and 16b', respectively. The blow fluid lines 17L have, downstream of the branch points in directions of flow of blow fluid, blow fluid on-off valves 17a and 17a' and 17b and 17b', respectively, alternately opened/closed by an alternation control signal 17s from the controller 12.

Pots 18a and 18b for recovery of soot and other foreign matters dropped by the operations of the soot blowers 16a and 16' and 16b and 16b' are connected to bottoms of the one- and the other-end-side heat storage units 14a and 14b through discharge pipes 20a and 20b with recovery valves 19a and 19b opened/closed as needs demands, respectively. A pot 18 for recovery of soot and other foreign matters entered into the flow passages 4a and 4b by the operations of the soot blowers 16a, 16a', 16b and 16b' is connected to a bottom of the communication passage 4c in the primary reforming furnace 4 through a discharge pipe 20 with a recovery valve 19 opened/closed as need demands.

Connected ends of the syngas supply and lead-out lines 7L and 9L to the one-end-side lead-in-out port 5a in the one-end-side heat storage unit 14a are formed with bend pipes 21a and 22a opened downwardly in the one-end-side lead-in-out port 5a so as not to accumulate the soot and other foreign matters in the syngas supply and lead-out lines 7L and 9L, respectively. Similarly, connected ends of the syngas supply and lead-out lines 7L and 9L to the other-end-side lead-in-out port 5b in the other-end-side heat storage unit 14b are formed with bend pipes 21b and 22b opened downwardly in the other-end-side lead-in-out port 5b so as not to accumulate the soot and other foreign matters in the syngas supply lines 7L and line 9L, respectively.

In the one- and the other-end-side heat storage units 14a and 14b, the one- and the other-end-side heat storage bodies 6a and 6b are arranged on support members 23a and 23b, respectively.

Next, a mode of operation of the above-mentioned further embodiment will be described.

As shown in FIG. 4, the tar-containing syngas produced in the gasification furnace 1 is made free from dust in the dust removal device 2 and is introduced into the tar reforming furnace 3.

In FIG. 5, the syngas lead-in on-off valves 7a and 7b incorporated in the syngas supply line 7L in the syngas alternating lead-in system 7 leading to the lead-in-out ports 5a and 5b of the heat storage units 14a and 14b are opened and closed, respectively, by the alternation control signal 7s from the controller 12. In this state, the syngas lead-out on-off valves 9a and 9b incorporated in the syngas lead-out lines 9L in the syngas alternating lead-out system 9 connected to the lead-in-out ports 5a and 5b are closed and opened, respectively, by the alternation control signal 9s from the controller 12. In this case, the primary-oxidant on-off valves 8a and 8b incorporated in the one and the other primary-oxidant supply lines 8L in the primary-oxidant alternating supply system 8 axially connected to the flow passages 4a and 4b in the primary reforming furnace 4 is opened and closed, respectively, by the alternation control signal 8s from the controller 12.

Figure 9:
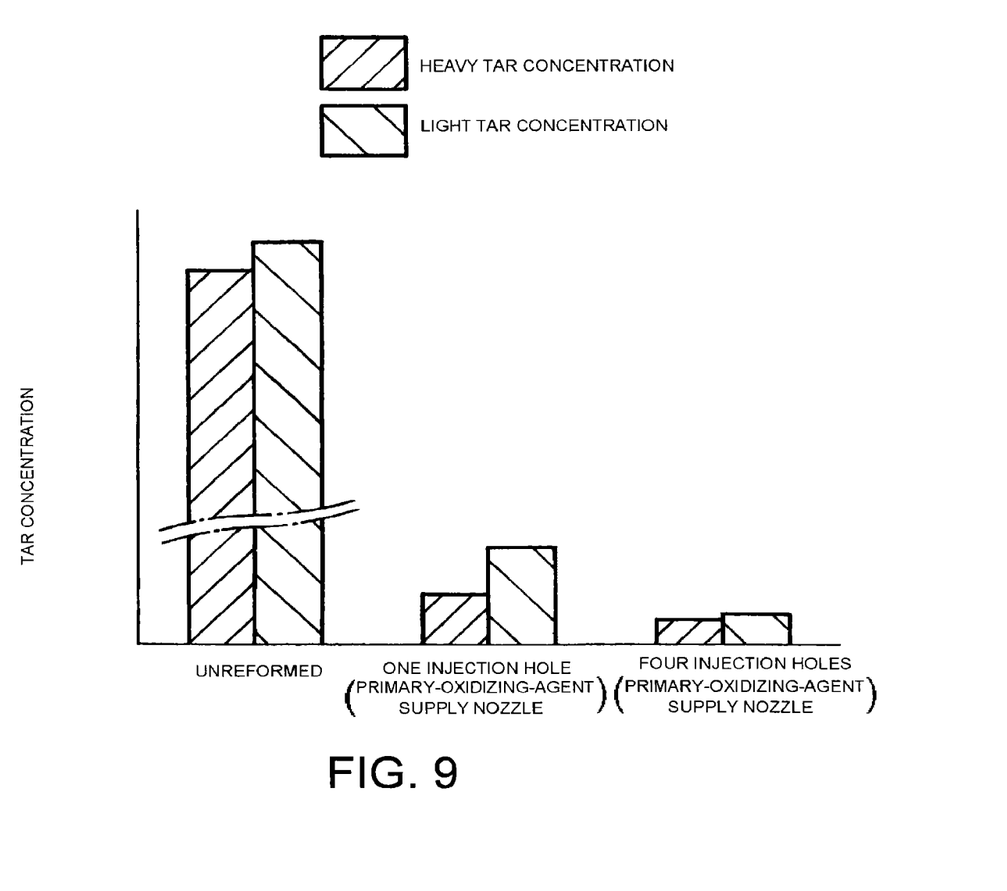
FIG. 9 is a diagram showing differences in tar concentration and in reforming efficiency due to differences in number of injection holes on the primary-oxidant supply nozzle in the further embodiment of the tar reforming furnace according to the disclosure.

In this state, the tar-containing syngas is entered from the one-end-side lead-in-out port 5a in the primary reforming furnace 4 and is passed through and preheated by the one-end-side heat storage body 6a and then, as shown in FIG. 6, is supplied through the lead-in-out line 15a tangentially to the one-side flow passage 4a with the circular cross-section while the oxidant is introduced from the primary-oxidant supply line 8L in the primary-oxidant alternating supply system 8 axially to the one-side flow passage 4a with the circular cross-section in the primary reforming furnace 4. As a result, the syngas becomes swirling flow in the one-side flow passage 4a with the circular cross-section in the primary reforming furnace 4 and the oxidant is axially introduced into the syngas as the swirling flow, which facilitates the mixing and enables more efficient reforming of the tar contained in the syngas in the primary reforming furnace 4. Moreover, each of the primary-oxidant supply nozzles 8N in the primary-oxidant alternating supply system 8 has a tip end formed with a plurality of (for example, four) injection holes 8h as shown in FIGS. 8a and 8b so as to blow a primary oxidant to the flow passage 4a or 4b in a wider angle to further facilitate the mixing with the syngas. It is experimentally confirmed as shown in FIG. 9 that the primary-oxidant supply nozzle 8N formed with the four injection holes 8h is lower both in heavy and light tar concentrations and higher in reforming efficiency than that with the single injection hole. The syngas blown with and oxidation reformed by the oxidant is entered from the flow passage 4a, passed through the communication passage 4c, the flow passage 4b and the lead-in-out line 15b to the other-end-side heat storage body 6b and then is introduced though the other-end-side lead-in-out port 5b to the secondary reforming furnace 10 and is passed downstream under pressure.

After the elapse of a predetermined period of time (a few seconds to dozens of seconds), in FIG. 5, the syngas lead-in on-off valve 7a and 7b incorporated in the syngas supply line 7L in the syngas alternating lead-in system 7 branched and leading to the lead-in-out ports 5a and 5b of the primary reforming furnace 4 is closed and opened, respectively, by the alternation control signal 7s from the controller 12. The syngas lead-out on-off valves 9a and 9b incorporated in the syngas lead-out lines 9L in the syngas alternating lead-out system 9 connected to the lead-in-out ports 5a and 5b are opened and closed, respectively, by the alternation control signal 9s from the controller 12. In this case, the primary-oxidant on-off valves 8a and 8b incorporated in the one and the other primary-oxidant supply lines 8L in the primary-oxidant alternating supply system 8 connected axially to the flow passages 4a and 4b in the primary reforming furnace 4 is closed and opened, respectively, by the alternation control signal 8s from the controller 12.

In this state, the tar-containing syngas is entered from the other-end-side lead-in-out port 5b in the primary reforming furnace 4 and is passed through and preheated by the other-end-side heat storage body 6b, and then, as shown in FIG. 6, is supplied through the lead-in-out line 15b tangentially to the other side flow passage 4b with the circular cross-section while the oxidant is introduced from the primary-oxidant supply line 8L in the primary-oxidant alternating supply system 8 axially to the other side flow passage 4b with the circular cross-section in the primary reforming furnace 4. As a result, the syngas becomes swirling flow in the other-side flow passage 4b with the circular cross-section in the primary reforming furnace 4, and the oxidant is axially introduced into the syngas as the swirling flow, which facilitates mixing and enables more efficient reforming of the tar contained in the syngas in the primary reforming furnace 4. Moreover, each of the primary-oxidant supply nozzles 8N in the primary-oxidant alternating supply system 8 has a tip end formed with a plurality of (for example, four) injection holes 8h as shown in FIGS. 8a and 8b so as to blow the primary oxidant to the flow passage 4a or 4b in a wider angle to further facilitate the mixing with the syngas. As mentioned in the above, it is experimentally confirmed as shown in FIG. 9 that the primary-oxidant supply nozzle 8N formed with the four injection holes 8h is lower both in heavy and light tar concentrations and higher in reforming efficiency than that with the single injection hole. The syngas blown with and oxidation reformed by the oxidant is entered from the flow passage 4b, passed through the communication passage 4c, the flow passage 4a and the lead-in-out line 15a to the one-end-side heat storage body 6a and is introduced through the one-end-side lead-in-out port 5a to the secondary reforming furnace 10 and is passed downstream under pressure.

As mentioned in the above, through the alternation in the syngas alternating lead-in and -out systems 7 and 9 and in the primary-oxidant alternating supply system 8 at every predetermined time interval, the operations of the syngas being passed through and preheated by the one- and the other-end-side heat storage bodies 6a and 6b and being passed through and heating the other- and the one-end-side heat storage bodies 6b and 6a, respectively, are alternately repeated to continuously reform the tar contained in the syngas.

Here, at the timing of the alternation of the respective syngas lead-out on-off valves 9a and 9b in the syngas alternating lead-out system 9, the unreformed tar-containing syngas may be discharged from the one- and the other-end-side lead-in-out ports 5a and 5b directly to the one and the other syngas lead-out lines 9L, respectively.

However, in accordance with the timing of the alternation of the respective syngas lead-out on-off valves 9a and 9b in the syngas alternating lead-out system 9, the secondary-oxidant on-off valve 11a incorporated in the secondary-oxidant supply line 11L in the secondary-oxidant supply system 11 connected to the upper portion of the secondary reforming furnace 10 is opened to supply the oxidant to the secondary reforming furnace 10 by the alternation control signal 11s from the controller 12. Thus, unreformed tar is reformed in the secondary reforming furnace 10 and is prevented from being discharged downstream without reformed. Moreover, the syngas is supplied through the syngas lead-out line 9L in the syngas alternating lead-out system 9 tangentially to the secondary reforming furnace 10 with the circular cross-section as shown in FIG. 7 while the oxidant is introduced from the secondary-oxidant supply line 11L in the secondary-oxidant supply system 11 axially to the secondary reforming furnace 10 with the circular cross-section as shown in FIG. 5. Thus, the syngas becomes a swirling flow in the secondary reforming furnace 10 with the circular cross-section and the oxidant is axially introduced into the syngas as the swirling flow, which facilitates the mixing and enables more efficient reforming of the tar contained in the syngas also in the secondary reforming furnace 10.

As a result, also in the further embodiment shown in FIGS. 5-9, just like the embodiment shown in FIGS. 1-4, no rotary mechanism for rotatively driving the heat storage body is needed unlike the tar reforming furnace disclosed in Patent Literature 1, which simplifies the structure and enables sufficient tar reforming because of long residence time of the syngas at the hot area.

Furthermore, unlike the tar reforming furnace disclosed in Patent Literature 2, even if any unreformed tar-containing syngas is discharged through the one- or the other-end-side lead-in-out port 5a or 5b directly to the one or the other syngas lead-out line 9L at the timing of the alternation, the oxidant is supplied to the secondary reforming furnace 10 only at the alternation in the syngas alternating lead-in and -out systems 7 and 9 and the unreformed tar is reformed. There is no fear of any unreformed tar being discharged downstream without reformed.

Further, when the syngas is entered through the one-end-side lead-in-out port 5a, is passed through the one-end-side heat storage body 6a, the lead-in-out line 15a and the one side flow passage 4a, the communication passage 4c, the flow passage 4b, the lead-in-out line 15b and the other-end-side heat storage body 6b and then is introduced into the other-end-side lead-in-out port 5b, the blow fluid on-off valves 17a and 17b' are opened and the blow fluid on-off valves 17a' and 17b are closed by the alternation control signal 17s from the controller 12 in accordance with the direction of flow of the syngas. Thus, the blow fluid is blown to the one- and the other-end-side heat storage bodies 6a and 6b by the soot blowers 16a and 16b', respectively, whereby the soot and other foreign matters attached to the one- and the other-end-side heat storage bodies 6a and 6b are removed. To the contrary, when the syngas is entered through the other-end-side lead-in-out port 5b, is passed through the other-end-side heat storage body 6b, the lead-in-out line 15b and the other side flow passage 4b, the communication passage 4c, the flow passage 4a, the lead-in-out line 15a and the one-end-side heat storage body 6a and then is introduced into the one-end-side lead-in-out port 5a, the blow fluid on-off valves 17b and 17a' are opened and the blow fluid on-off valves 17b' and 17a are closed by the alternation control signal 17s from the controller 12 in accordance with the direction of flow of the syngas. Thus, the blow fluid is blown to the other- and the one-end-side heat storage body 6b and 6a by the soot blowers 16b and 16a', respectively, whereby the soot and other foreign matters attached to the other- and the one-end-side heat storage bodies 6b and 6a are removed. Thus, the one- and the other-end-side heat storage bodies 6a and 6b are prevented from being clogged and the syngas passed through the heat storage bodies 6a and 6b is prevented from being increased in pressure drop.

The soot and other foreign matters dropped by the operations of the soot blowers 16a and 16a' and 16b and 16b' are recovered by the pots 18a and 18b through the discharge pipes 20a and 20b by opening the recovery valves 19a and 19b as need demands, respectively. Further, the soot and other foreign matters guided to the flow passages 4a and 4b are recovered by the discharge pipe 20 by opening the recovery valve 19 as need demands.

Here, the connected ends of the syngas supply and lead-out lines 7L and 9L to the one-end-side lead-in-out port 5a in the one-end-side heat storage unit 14a are provided with the bend pipes 21a and 22a opening downward in the one-end-side lead-in-out port 5a, respectively, so that there is no fear that the soot and other foreign matters accumulate in the syngas supply and lead-out lines 7L and 9L. Similarly, the connected ends of the syngas supply and lead-out lines 7L and 9L to the other-end-side lead-in-out port 5b in the other-end-side heat storage unit 14b are provided with the bend pipes 21*b* and 22*b* opening downward in the other-end-side lead-in-out port 5*b*, respectively, so that there is no fear that the soot and other foreign matters accumulate in the syngas supply and lead-out lines 7L and 9L.

The syngas becoming high-temperatured due to the mixing with the oxidant in the flow passage 4*a* flows through the communication passage 4*c*, the flow passage 4*b*, the lead-in-out line 15*b* and then to the other-end-side heat storage body 6*b* where the syngas is robbed of heat; the syngas robbed of heat flows into the other-end-side lead-in-out port 5*b* so that the support member 23*b* is prevented from being exposed to the high-temperatured syngas to suppress deterioration of the support member 23*b*. Alternatively, the syngas becoming high-temperatured in the mixing with the oxidant in the flow passage 4*b* flows through the communication passage 4*c*, the flow passage 4*a*, the lead-in-out line 15*a* and then to the one-end-side heat storage body 6*a* where the syngas is robbed of heat; the syngas robbed of heat flows into the one-end-side lead-in-out port 5*a* so that the support member 23*a* is prevented from being exposed to the high-temperatured syngas to suppress deterioration of the support member 23*a*.

Thus, also in the further embodiment shown in FIGS. 5-9, tar reforming can be satisfactorily conducted with the simple structure and unreformed tar-containing syngas can be prevented from being discharged at the alternation.

As in the further embodiment, the configuration that the syngas supplied from the syngas alternating lead-in system 7 to the one- and the other-end-side lead-in-out ports 5*a* and 5*b* in the primary reforming furnace 4 and passed through the one- and the other-end-side heat storage bodies 6*a* and 6*b* is supplied tangentially to the one- and the other-side flow passages 4*a* and 4*b* with the circular cross-sections in the primary reforming furnace 4 and the oxidant is introduced from the primary-oxidant alternating supply system 8 axially to the one- and the other-side flow passages 4*a* and 4*b* with the circular cross-sections in the primary reforming furnace 4, respectively, is preferable in that the syngas becomes swirling flow in the one- and the other-side flow passages 4*a* and 4*b* with the circular cross-sections in the primary reforming furnace 4, respectively, and the oxidant is axially introduced into the syngas as the swirling flow, which facilitates the mixing and enables more efficient reforming of the tar contained in the syngas in the primary reforming furnace 4.

The configuration that the syngas is supplied from the syngas alternating lead-out system 9 tangentially to the secondary reforming furnace 10 with the circular cross-section and the oxidant is introduced from the secondary-oxidant supply system 11 axially to the secondary reforming furnace 10 with the circular cross-section is preferable in that the syngas becomes swirling flow in the secondary reforming furnace 10 with the circular cross-section and the oxidant is introduced axially to the syngas as the swirling flow, which facilitates the mixing and enables more efficient reforming of the tar contained in the syngas also in the secondary reforming furnace 10.

Further, the soot blowers 16*a* and 16*a*' and 16*b* and 16*b*' provided for removal of any foreign matters attached to the one- and the other-end-side heat storage bodies 6*a* and 6*b* can prevent the heat storage bodies 6*a* and 6*b* from being clogged and can suppress any increase in pressure drop of the syngas passed through the heat storage bodies 6*a* and 6*b*, respectively.

It is to be understood that a tar reforming furnace according to the disclosure is not limited to the above embodiments and that various changes and modifications may be made without departing from the scope of the disclosure. For example, the soot blowers shown in the further embodiment may be arranged in the primary reforming furnace in the embodiment shown in FIG. 1.

REFERENCE SIGNS LIST 3 tar reforming furnace
4 primary reforming furnace
4*a* flow passage
4*b* flow passage
5*a* one-end-side lead-in-out port
5*b* other-end-side lead-in-out port
6*a* one-end-side heat storage body
6*b* other-end-side heat storage body
7 syngas alternating lead-in system
8 primary-oxidant alternating supply system
9 syngas alternating lead-out system
10 secondary reforming furnace
11 secondary-oxidant supply system
12 controller
16*a* soot blower
16*a*' soot blower
16*b* soot blower
16*b*' soot blower
C1 virtual circle
C2 virtual circle

The invention claimed is:

1. A tar reforming furnace comprising:
a primary reforming furnace internally formed with sequentially extending flow passages and a communication passage for syngas,
a one-end-side heat storage body in a one-end-side port on one end of the sequentially extending flow passages and the communication passage in the primary reforming furnace,
an other-end-side heat storage body in an other-end-side port on an other end of the sequentially extending flow passages and the communication passage in the primary reforming furnace,
a syngas system for introducing the syngas, alternatively using a first pair of valves, to pass through one of the one-end-side heat storage body or the other-end-side heat storage body into the flow passages in the primary reforming furnace,
a primary-oxidant system for supplying an oxidant, alternatively using a second pair of valves, to the syngas introduced from the syngas system into the flow passages in the primary reforming furnace, downstream in a flow direction of the syngas passed through said one of the one-end-side heat storage body or the other-end-side heat storage body,
a further syngas system for deriving, alternatively using a third pair of valves, the reformed syngas supplied with the oxidant by the primary-oxidant system through the other of the one-end-side heat storage body or the other-end-side heat storage body,
a secondary reforming furnace into which is introduced the syngas from the primary reforming furnace by the further syngas system,
a secondary-oxidant system for supplying an oxidant, using a valve, to the syngas introduced into the secondary reforming furnace only at alternation of the syngas flow direction in the syngas system and the further syngas system, and a controller for controlling the first set of valves, the second set of valves, the third set of valves, and the valve, wherein the tar reforming furnace is configured to supply the syngas supplied from the syngas system to the one-end-side port on the one end of the sequentially extending flow passages and the communication passage in the primary reforming furnace and passed through the one-end-side heat storage body tangentially to a one-side one of the flow passages with circular cross-section in the primary reforming furnace and introduce the oxidant from the primary-oxidant system axially into the one-side flow passage with the circular cross-section in the primary reforming furnace, wherein the tar reforming furnace is configured to supply the syngas supplied from the syngas system to the other-end-side port on the other end of the sequentially extending flow passages and the communication passage in the primary reforming furnace and passed through the other-end-side heat storage body tangentially to an other-side flow passage with a circular cross-section in the primary reforming furnace and introduce the oxidant from the primary-oxidant system axially into the other-side flow passage with the circular cross-section in the primary reforming furnace, wherein the tar reforming furnace is configured to supply the syngas from the further syngas system tangentially to the secondary reforming furnace with a circular cross-section and introduce the oxidant from the secondary-oxidant system axially to the secondary reforming furnace with the circular cross-section.

2. The tar reforming furnace as claimed in claim 1, further comprising soot blowers for removing foreign matters attached to the heat storage bodies.

3. The tar reforming furnace as claimed in claim 1, wherein the tar reforming furnace is free of a rotary mechanism which rotatively drives at least one of the heat storage bodies.

* * * * *